United States Patent [19]

Phillips

[11] 4,193,268
[45] Mar. 18, 1980

[54] EVAPORATION DEVICE AND METHOD WITH CONTROLLED REFRIGERANT EXPANSION AND STORAGE

[75] Inventor: Benjamin A. Phillips, Benton Harbor, Mich.

[73] Assignee: Allied Chemical Corporation, Morris Township, Morris County, N.J.

[21] Appl. No.: 962,838

[22] Filed: Nov. 21, 1978

Related U.S. Application Data

[63] Continuation-in-part of Ser. No. 796,773, May 13, 1977, Pat. No. 4,127,010.

[51] Int. Cl.² ............................ F25B 15/00; F25B 37/00
[52] U.S. Cl. ........................................ 62/101; 62/476; 62/486; 62/487; 62/494
[58] Field of Search ................ 62/101, 103, 504, 476, 62/486, 464, 494, 487

[56] References Cited

U.S. PATENT DOCUMENTS

| | | | |
|---|---|---|---|
| 1,506,530 | 8/1924 | Kasley | 62/101 |
| 2,059,725 | 11/1936 | Carrier | 62/504 |
| 2,064,233 | 12/1936 | Thomas | 62/103 |
| 2,069,865 | 2/1937 | Ullstrand | 62/103 |
| 2,223,752 | 12/1940 | Ullstrand | 62/103 |
| 2,352,814 | 7/1944 | Thomas | 62/494 |
| 2,392,894 | 1/1946 | Zwickl | 62/101 |
| 2,465,904 | 3/1949 | McNeely | 62/103 |
| 2,640,331 | 6/1953 | Backstrom | 62/464 |
| 2,713,778 | 7/1955 | Berry | 62/101 |
| 2,738,653 | 3/1956 | Berry | 62/101 |
| 2,761,656 | 9/1956 | Spear | 62/487 |
| 2,795,940 | 6/1957 | Kogel | 62/471 |
| 3,279,202 | 10/1966 | Eberz | 62/101 |
| 3,299,652 | 1/1967 | Eisberg et al. | 62/476 |
| 3,412,569 | 11/1968 | Arledge, Jr. | 62/504 |
| 3,527,061 | 9/1970 | Kruggel | 62/142 |
| 3,556,200 | 1/1971 | Leonard, Jr. | 165/2 |
| 3,563,052 | 2/1971 | Brown | 62/476 |
| 3,580,001 | 5/1971 | Eisberg | 62/101 |
| 3,620,036 | 11/1971 | Leonard, Jr. | 62/101 |
| 3,831,390 | 8/1974 | Hopkins | 62/476 |

*Primary Examiner*—Lloyd L. King
*Attorney, Agent, or Firm*—Alan M. Doernberg; Jay P. Friedenson

[57] ABSTRACT

Evaporation device with an expansion component which may be a capillary or series of orifices of increasing cross-sectional area, an insulated housing, a coil within the housing for conducting a material to be cooled by the evaporation of liquid refrigerant, a separation component for receiving refrigerant from the expansion component and separating liquid refrigerant from gaseous refrigerant and directing liquid refrigerant over the coil, an outlet for receiving gaseous refrigerant from the separation component and from over the coil, and a storage element within the housing beneath the coil for collecting liquid refrigerant not evaporated by passage over the coil. Preferred evaporation devices also include a precooler and a liquid refrigerant outlet which permits controlled liquid refrigerant outflow.

17 Claims, 6 Drawing Figures

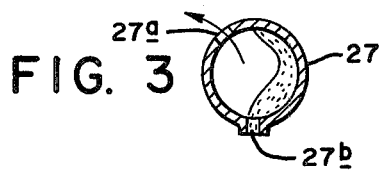
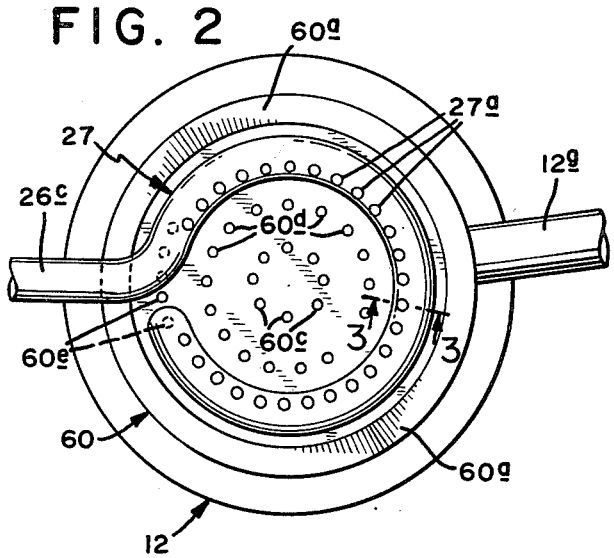
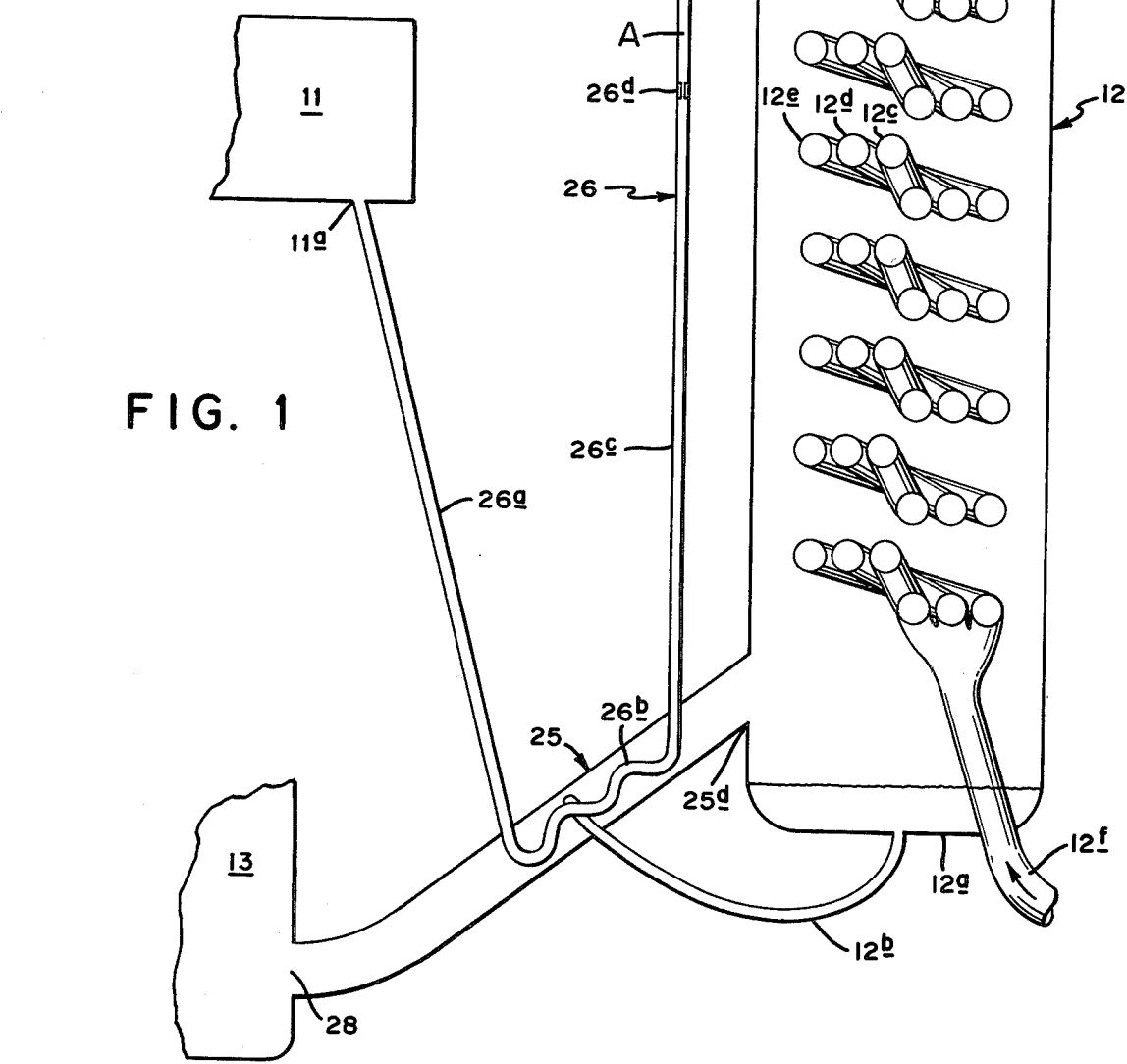

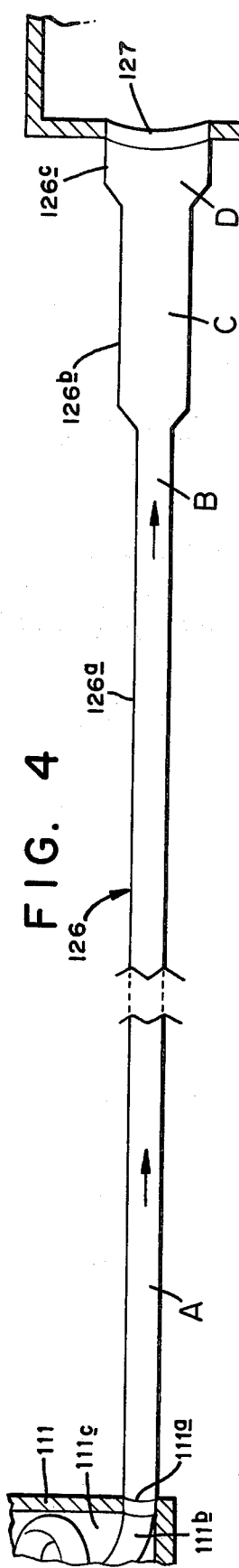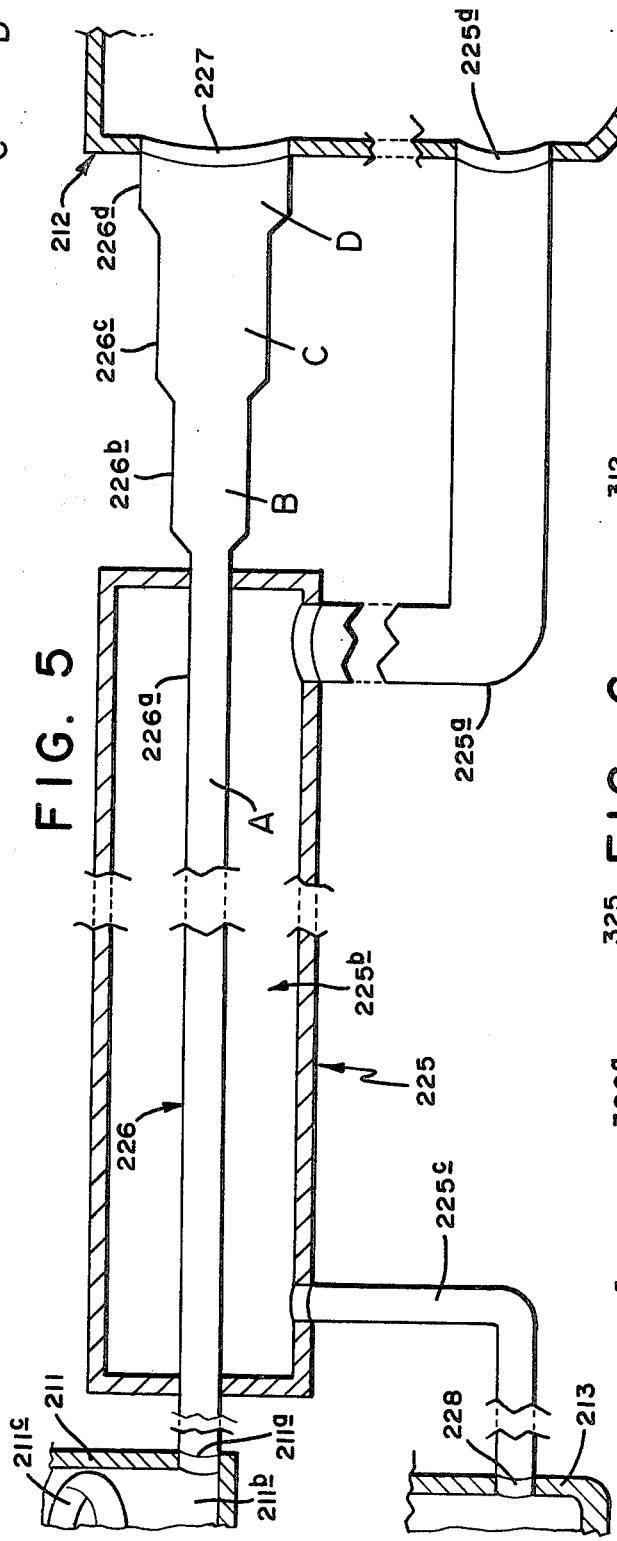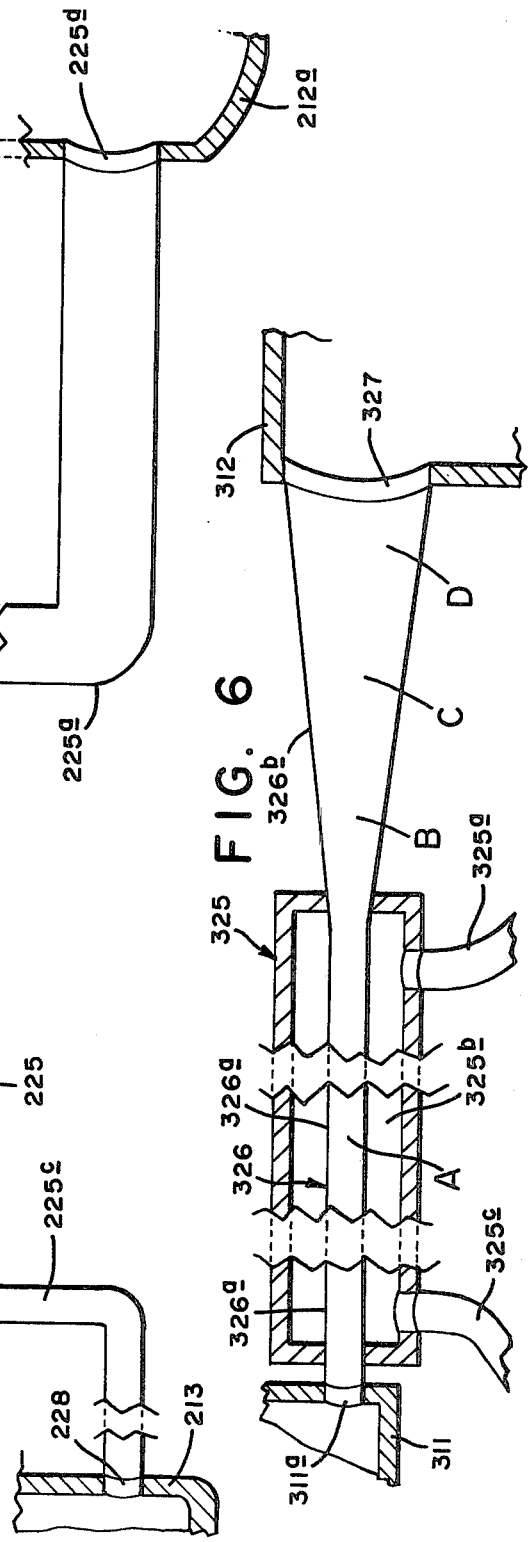

EVAPORATION DEVICE AND METHOD WITH CONTROLLED REFRIGERANT EXPANSION AND STORAGE

CROSS-REFERENCE TO RELATED APPLICATION

This is a continuation-in-part of my application, Ser. No. 796,773, filed May 13, 1977, entitled "Improved Heat Activated Absorption Heat Pump Apparatus and Method", now U.S. Pat. No. 4,127,010, issued Nov. 28, 1978.

BACKGROUND OF THE INVENTION

Systems operating on a refrigerant cycle, both refrigeration and heat pump systems, include a portion which expands a condensed liquid refrigerant from a relatively high condenser pressure to a relatively low evaporator pressure. This expansion commonly includes a partial evaporation of the refrigerant. Expansion valves, capillaries, float valves and orifices have been used for such expansion means. In the evaporator proper, the refrigerant evaporates, drawing heat of vaporization from a material to be cooled, such as circulating air, a secondary coolant such as glycol-water or the like. Precoolers are sometimes used to pass evaporated refrigerant coming out of the evaporator in heat exchange relation with condensed refrigerant prior to expansion. Such expansion and evaporation devices find application in many different refrigeration cycles, including standard compression and absorption cycles.

BRIEF DESCRIPTION OF THE INVENTION

The present invention includes an evaporation device comprising expansion means for receiving liquid refrigerant at a condenser pressure and for expanding said liquid refrigerant to an evaporator pressure lower than the condenser pressure;
  an insulated housing;
    a coil within said housing having an inlet and an outlet through said housing for conducting within the interior of said coil a material to be cooled by the evaporation of liquid refrigerant;
  separation means for receiving refrigerant from said expansion means and for separating liquid refrigerant from gaseous refrigerant therein and for directing said liquid refrigerant over said coil in heat exchange relation with the interior of said coil;
  means for flowing refrigerant as a thin film over the outside surface of said coil;
  gas outlet means for receiving gaseous refrigerant from said separation means and from over said coil and for conducting gaseous refrigerant out of said housing; and
  storage means beneath said coil for collecting liquid refrigerant not evaporated by passage over said coil within said housing.

The present invention also includes a method of evaporating a refrigerant comprising the steps:
  expanding liquid refrigerant from a condenser pressure to an evaporator pressure lower than said condenser pressure;
  separating gaseous refrigerant from the liquid refrigerant;
  directing liquid refrigerant as a thin film over and in heat exchange relation with a coil containing material to be cooled, whereby liquid may evaporate by withdrawing heat of evaporation from the material to be cooled to form gaseous refrigerant;
  receiving and storing unevaporated liquid refrigerant beneath the coil; and
  withdrawing gaseous refrigerant from adjacent the coil.

The present invention also includes preferred forms of the above method further comprising the step of withdrawing stored unevaporated liquid refrigerant at a controlled rate from beneath the coil and increasing the net storage of unevaporated refrigerant when the rate of formation of unevaporated refrigerant exceeds the controlled rate.

The present invention also includes a method of absorption heating or cooling including the above-preferred method and further comprising the steps of absorbing the withdrawn gaseous refrigerant and withdrawn liquid refrigerant into an absorbent, generating refrigerant vapor from the absorbent at a generator pressure at least as great as the condenser pressure, condensing the refrigerant vapor at the condensing pressure to form the liquid refrigerant, and wherein the net storage of refrigerant decreases the concentration of refrigerant in said absorbent both before and after said generating step.

BRIEF DESCRIPTION OF THE THE DRAWING

FIG. 1 is a side elevational view of the evaporator portion of a heat pump system with connections to the condenser and absorber according to a first embodiments of the present invention;

FIG. 2 is a top plan view taken along line 2—2 in FIG. 1;

FIG. 3 is an expanded plan view taken along line 3—3 in FIG. 2;

FIG. 4 is a plan view of an expansion capillary, broken off, according to a second embodiment of the invention;

FIG. 5 is a plan view of an expansion capillary and precooler, broken off, according to a third embodiment of the invention.

FIG. 6 is a plan view of an expansion capillary and precooler according to a fourth embodiment of the invention.

DETAILED DESCRIPTION OF THE INVENTION

The evaporation device of the present invention may be used in various heating and cooling systems employing refrigeration cycles including expansion and evaporation of refrigerant, including chlorofluorocarbon refrigerants, chlorinated hydrocarbon refrigerants such as methylene chloride and other refrigerants such as ammonia. Nevertheless, preferred forms of the evaporation device find particular application to absorption systems such as that described in my application Ser. No. 796,773, now U.S. Pat. No. 4,127,010 and particularly, absorption heat pump systems capable of operating in both heating and cooling modes. It will be appreciated that, in such a system, the evaporation device draws heat into the refrigerant indirectly from ambient air in the heating mode and from the space to be cooled in the cooling mode. The material acting as a heat transfer medium may be water with a proportion of an antifreeze such as ethylene glycol. Alternatively, ambient or circulating air or other material to be heated or cooled may be circulated directly through the coil or coils.

The condenser pressure from which expansion occurs will be determined by the design of the condenser, the refrigerant used and the temperature, identity and flow rate of coolant through the condenser. For example, in the system described in application Ser. No. 796,773, referenced above, the condenser pressure is determined by the refrigerant such as dichloromonofluoromethane (R-21) or chlorotrifluoroethane (R 133 or 133a) and the portion of the heated glycol-water circuit passing through the condenser. Normally, the condenser pressure will approximate the vapor pressure of pure refrigerant at the temperature in the main portion of the condenser, which will be 10°–20° F. hotter than the temperature of coolant entering the condenser. As described in the above-referenced application, that pressure may vary, both in the heating and cooling modes, depending on ambient temperature in the cooling mode and indirectly on the indoor return air temperature in the heating mode. For R-21 ETFE absorption pairs, the condenser pressure will normally vary between about 40 and about 65 psia. Some refrigerants such as ammonia have condenser pressures as high as about 300 psia, while others such as dichlorotrifluoroethane (R 123 or 123a) have condenser pressures as low as 25 psia.

The evaporator pressure will be lower in any refrigeration cycle than the condenser pressure. In general, the evaporator pressure will be near the vapor pressure of pure refrigerant at the minimum temperature in the evaporator. In an air conditioning system or in the cooling mode of a heat pump, it is desirable for the coolant fluid to return to the space to be cooled at about 45° to 50° F. such that the minimum evaporator temperature is about 40° F. Accordingly, the evaporator should operate at a pressure equal to the vapor pressure of pure refrigerant at about 40° F. For R-21, this is about 12 psia. For other refrigerants, this value will be as low as about 5 psia or as high about 80 psia. In the heating mode for a heat pump, the evaporator should operate about 5°–15° F. below the ambient air temperature. Accordingly, when the ambient temperature is 45° F., the evaporator temperature should be about 35° F. and the evaporator pressure should be the vapor pressure of refrigerant at about 35° F. For R-21, this value is about 10 psia. For other refrigerants, it may be as low as 4 psia or as high about 65–70 psia. For ambient air conditions below 45° F., the evaporator pressure will be still lower. For example, with R-21 in an ambient air temperature of about 10° F., the evaporator pressure will be about 4 psia. At sufficiently cold ambient air temperature, it may be desirable with certain refrigerant to reduce the differential to below 10° F. such as a −5° F. evaporator temperature at 0° F. ambient temperature.

The actual condenser and evaporator pressures may vary from these norms, especially in absorption systems wherein some absorbent is present in the refrigerant in both the condenser and evaporator. Different portions of the condenser and evaporator may each operate simultaneously over a temperature range of several ° F. and even a slight pressure range. For systems with different portions of the condenser and evaporator operating at different temperatures, it is the pressure and temperature at the condenser outlet and temperature and pressure at the evaporator inlet that are intended in describing the operation of the expansion means.

The expansion means may be in any of numerous forms, including conventional expansion or float valves, capillaries, orifices and the like. It is preferred, however, that the expansion means be an expanding bore capillary or an expanding series of orifices as described and illustrated below.

The evaporator itself should have a housing which is sufficiently insulated to prevent substantial loss of cooling capacity. The coil within the housing should be capable of conducting coolant out of mass exchange relation, but in heat exchange relation with evaporating refrigerant. Of course, a plurality of such coils may be used, as is illustrated below.

Separation means may be a single device for separating liquid and gaseous refrigerant coming from the expansion means and for directing liquid refrigerant over the coil. Alternatively, the separation means may include a separation component and a distributor component which receives liquid refrigerant from the separation component and distributes it. All or part of the separation means may be outside the evaporator housing proper, although it is preferred that the separation means for entirely or substantially entirely within the housing.

The gas outlet means may include, for example, a simple pipe leading from adjacent the coil. Nonetheless, it is preferred that the gas outlet means include a gas precooler portion in heat exchange relation with a liquid refrigerant precooler portion which may be a part of the expansion means. In some preferred forms having such a precooler, the expansion means includes a plurality of orifices of sufficiently small cross-sectional area to maintain a pressure differential between said condenser pressure and said evaporator pressure.

In some further preferred forms, all of the orifices are within a conduit outside said housing and connected between said liquid refrigerant precooler portion and said separation means. In still other preferred forms having such a precooler as described in the preceding sentence, the expansion means includes a capillary portion of sufficiently small cross-sectional area and sufficiently long length to maintain the pressure differential between said condenser pressure and said evaporator pressure. In some further preferred forms as described in the preceding sentence, the capillary portion is outside said housing and connected between said liquid refrigerant precooler portion and said separation means. This precooler action increases the refrigeration capacity of the liquid and warms up the evaporated refrigerant. Warmer evaporated refrigerant enables more heat to be recovered from the absorber of an absorption system.

Three preferred forms of the method of the invention are those wherein said expanding step includes passing liquid refrigerant in heat exchange relation with gaseous refrigerant withdrawn from adjacent the coil, those wherein said expanding step includes passing liquid refrigerant through a series of orifices of increasing cross-sectional area and those wherein said expanding step includes passing liquid refrigerant through a capillary of increasing cross-sectional area. Some more preferred forms of the last-described preferred method are those wherein the capillary increases by steps in cross-sectional area.

Some preferred forms of the evaporation method are those further comprising the step of withdrawing stored unevaporated liquid refrigerant at a controlled rate (which may be a function of the head of unevaporated refrigerant) from beneath the coil and increasing the net storage of unevaporated refrigerant when the rate of collection of unevaporated refrigerant exceeds the controlled rate. Preferred forms of the method of absorption heating or cooling of the invention include the last-described method and further comprise the steps of absorbing the withdrawn gaseous refrigerant and withdrawn liquid refrigerant into an absorbent generating refrigerant vapor from the absorbent at a generator pressure at least as great as the condenser pressure, condensing the refrigerant vapor at the condensing pressure to form the liquid refrigerant, and wherein the net storage of refrigerant decreases the concentration of refrigerant in said absorbent both before and after said generating step.

DETAILED DESCRIPTION OF THE PREFERRED EMBODIMENTS

Referring to FIG. 1, a portion of an absorption heat pump system is shown, including the condenser 11, an evaporator 12 and an absorber 13. The overall configuration of a heat pump system in which these elements may be included is disclosed in above-referenced application Ser. No. 796,773 which is incorporated herein by reference. A conduit 26 is provided leading from an outlet 11a of the condenser 11 to an inlet near the top of the evaporator 12 adjacent element 27 described below. Another conduit 25 known as a precooler connects an outlet 25d near the bottom of the evaporator 12 to an inlet 28 of the absorber 13. In general, the conduit 26 conducts and expands condensed refrigerant from the condenser 11 to the evaporator 12, while the conduit 25 conducts evaporated refrigerant from the evaporator 12 to the absorber 13. A first portion 26a of the conduit 26 leads from outlet 11a of the condenser 11 to the outer wall of the conduit 25, the precooler. A second portion 26b within conduit 25 passes from the end of portion 26a helically towards the outlet 25d which is the inlet of the conduit 25 and then passes through the wall of the conduit 25. A third portion 26c passes from the end of portion 26b upwards toward the top of the evaporator 12 and passes inwardly through the evaporator wall.

Within portion 26c, shortly below its entrance into the evaporator wall, are four elements 26d, 26e, 26f and 26g which are illustrated as donut-shaped inserts, but may also be indentations or deformations of the conduit portion 26c which have the effect of limiting its open cross-sectional area at selected points. These constriction points, known as orifices, are increasingly larger from 26d to 26e to 26f to 26g.

Within the evaporator 12 and connected to the top end of conduit portion 26c, is a separation element or centrifugal separator 27 shown in FIGS. 1, 2 and 3. The element 27 may be in the form of a loop of 360° of arc of a circle which is generally concentric with the cylindrical wall of the evaporator 12 and spaced a short distance inwardly therefrom and downwardly from the top of the evaporator. As shown best in FIGS. 2 and 3, a series of gas holes, 27a, are provided along the inner side of the loop formed by element 27 upwardly about 30°–40° from the horizontal. A series of liquid holes 27b are provided along the loop formed by element 27 opening directly downward (they may be somewhat outwardly of the bottom of the tube as well). A distributor plate 60 generally circular in shape with an outer edge portion or flange 60a extending upwardly at an angle therefrom is provided in evaporator 12 below element 27. As shown in FIGS. 1 and 2, the outer edge portion 60a of plate 60 terminates a short distance inside of the evaporator wall. The plate 60 is provided with three concentric rings of apertures, 60c, 60d and 60e, all inside of the flange 60a.

Below the distributor plate 60 are three helical coils 12c, 12d and 12e, each having as its helical axis a line which forms the cylindrical axis of the evaporator and which passes through a point which is the center of the plate 60 and the circles formed by apertures 60c, 60d and 60e. Innermost coil 12c is directly below apertures 60c; middle coil 12d is directly below apertures 60d; and outermost coil 12e is directly below apertures 60e. An inlet conduit 12f extends upwardly through the bottom wall of the evaporator 12 and connects to each of the coils 12c, 12d and 12e. An outlet conduit 12g connects the top of the coils 12c, 12d and 12e and extends out of the evaporator 12 at about or just below the height of the plate 60. Conduits 12f and 12g are, in operation, connected into a circuit for material to be cooled such as, preferably, a cooled water circuit containing an antifreeze such as ethylene glycol. In the above-reference application, Ser. No. 796,773, such a circuit is illustrated as connecting to an 8-way valve or the like, which is preferred.

The bottom of the evaporator 12 forms a cup 12a below the outlet 25d which is the inlet of the precooler 25. A restricted flow line 12b connects the bottom of the cup 12a to a point of the precooler which is shown as over the coil 26b.

Operation of the First Embodiment

In operation, refrigerant at high pressure from a compressor or generator (not shown) enters condenser 11 and is condensed therein rejecting heat to air or to a liquid coolant. Condensed refrigerant passes into conduit 26 through portion 26a to portion 26b where it is cooled by heat exchange through the wall of conduit portion 26b. Then passing into portion 26c, the refrigerant expands to successively lower pressures at the orifices at elements 26d, 26e, 26f and 26g. Assuming the refrigerant, for example R-21, is at a relatively high condenser pressure such as 55 psia, the temperature of refrigerant in conduit portion 26a will be about 120° F. and the pressure of refrigerant (including any vapor) about 55 psia. In the precooler 25, the refrigerant will be cooled to about 80° F., with the pressure of liquid in conduit portion 26c remaining about 55 psia. The vapor pressure of refrigerant will drop, however, to about 28 psia. The refrigerant will expand across orifice 26d to a pressure in region A of about 40 psia with the temperature remaining 80° F. and the vapor pressure 28 psia. The refrigerant will further expand across orifice 26e to a pressure in region B of about 28 psia, with the temperature remaining 80° F. and the vapor pressure 28 psia. Further expansion at orifice 26f will result in flashing of the refrigerant such that in region C, the temperature will be about 65° F. and the pressure will be about 21 psia. Still further expansion across restriction 26g will result in refrigerant in region D having a temperature of about 45° F. and a pressure of about 14 psia, which conditions will be found generally in the evaporator 12 as well. Under these conditions, the principal mass flow rate restriction will be at orifice 26f. This regime is typical of the operation of the absorption system described in application Ser. No. 796,773 in the cooling mode at temperatures such as 95° F. ambient. Under these conditions, at about point 26f, the refrigerant will begin flashing into the vapor bubbles. Since such flashing quickly cools the refrigerant, it will pass as a gas-liquid mixture through subsequent larger orifice 26g with only some increase in volume and will enter the evaporator 12 at a gas-liquid equilibrium point at about 14 psia and 45° F. with a minor weight content of vapor. The liquid will be pushed quickly by gas bubbles into and they will enter tangentially into element 27 with the centrifugal and gravity effects causing the heavier liquid to collect on the outside and bottom and the vapor to collect on the inside and top of element 27, as shown in FIG. 3. The liquid will fall through liquid holes 26b onto plate 60 where it forms a shallow pool within flange 60a. It drips through apertures 60c, 60d and 60e over, respectively, coils 12c, 12d and 12e. As the liquid cascades and winds as a film down the successive turns of the coils 12c, 12d and 12e, it evaporates by absorption of heat transferred from the interior of the coils. Under these air conditioning conditions, the refrigerant would normally be essentially completely evaporated before reaching the bottom of the coils. Some liquid containing absorbent and some refrigerant would reach cup 12a, and would be drained through line 12b into the precooler.

It will be appreciated that various techniques can be used to increase the wetting of the coils 12c, 12d and 12e to increase the heat exchange across the coils, including anodizing or conversion coating the exterior of the coils. The combination of element 27 and the shape and material of coils 12a, 12d and 12e are representative means for centrifugally separating liquid and gaseous refrigerant and flowing liquid refrigerant as a thin film over the outside surface of the evaporator coils.

Vapor within element 27, being on the inside as discussed above and shown in FIG. 3, passes through gas apertures 27a to the top most portion of evaporator 12 and then outwardly and downwardly outside of the flange 60a. This vapor, and vapor coming off of the coils, passes downwardly around the coils to point 25d where it leaves the evaporator and enters the precooler 25. Passing over portion 26b, it cools liquid there within at the high condenser pressure as described above and is warmed before entering the absorber 13 through inlet 28.

Under operating conditions of mild heating, such as 55°-60° F. ambient temperature, the above operation is substantially followed except that heat in the condenser is rejected to a coolant circuit which transmits heat into a house or the like and the coils 12c, 12d and 12e conduct a coolant conducting heat from ambient air. Since the condenser would operate at about 120° F. (because of its arrangement in the coolant circuit in relation to the absorber), it is at a condenser pressure of about 55 psia. The effect is that, in conduit 26, sufficient expansion occurs through the orifices 26d and 26e for flashing to occur at or near orifice 26f. The effect will be for the mass flow restriction point to be primarily at point 26f.

As heating conditions of increasingly cooler ambient air are encountered, the temperature of coolant entering through conduit 12f will decrease. Once it is below about 50° F., as when ambient temperature drops to below about 45° F., the refrigerant will cool the coils to 40° F. before all the refrigerant has evaporated. Excess unevaporated refrigerant (containing some absorbent) will fall from the coils into the cup 12a below point 25. Some of this liquid will flow out through line 12b into the precooler. Since somewhat less evaporation is occurring, the pressure in the evaporator 12 will begin falling slightly until more of the refrigerant can evaporate at a lower temperature, but some liquid will remain stored in cup 12a. Once a lower evaporator pressure is achieved, the liquid in cup 12a will remain constant by draining through line 12b at the same rate as it collects. By this storage, concentrations of refrigerant in the weak and strong liquors will drop slightly permitting lower pressures to be maintained throughout the system, particularly on the low pressure side.

As still lower ambient air temperature are encountered, such as about 35° F., the refrigerant will accumulate further in cup 12a. The pressure will drop still further, and the refrigerant vapor will pass to the absorber 13 at a lower rate. As a result, the liquid being pumped from the absorber at a constant rate will contain less and less refrigerant and thus be less "rich". In the generator, less refrigerant is distilled from this less "rich" solution, but the solution will be heated to a hotter temperature and become "weaker" or lower in refrigerant content before returning to the absorber. The effect of less refrigerant distilled in the generator 10 is less refrigerant condensing in the condenser 11 such that the condenser pressure will begin falling slightly.

The liquid refrigerant in conduit 26 will now be passing from a slightly lower condenser pressure, such as 53 psia to a lower evaporator pressure of about 8 psia. It is expected that the refrigerant will be precooled from about 118° F. (with a pressure of 53 psia) to about 75° F. in the precooler 25 such that refrigerant in conduit portion 26c will be at 75° F. and 53 psia, but with a vapor pressure of only about 25 psia. Expansion through orifice 26d will cause refrigerant in region A to be about 75° F. and 40 psia, with the vapor pressure still about 25 psia. Expansion through orifice 26e will cause refrigerant in region B to be about 75° F. and 28 psia, with the vapor pressure still about 25 psia. Further expansion through orifice 26f will cause flashing and cause refrigerant in region C to be about 65° F. and 20 psia (both liquid and vapor bubbles). Further expansion through orifice 26g will cause more flashing and a mixture of liquid refrigerant with vapor bubbles at 22° F. and 8 psia. Under these conditions mass flow rate control will probably be at orifice 26f.

Once ambient temperature drops to 10° F., refrigerant leaving the condenser in conduit portion 26a will be at about 113° F. and 50 psia, and it will be precooled to about 65° F. and 50 psia in conduit portion 26c by precooler 25. The vapor pressure of refrigerant at 65° F. is only 21 psia. Since the volume of refrigerant flowing under these conditions is much smaller than under mild ambient conditions, however, the entire pressure drop to 21 psia and 65° F. (in region A) can occur through orifice 26d. The first substantial flashing will then occur through orifice 26e to about 40° F. and 12 psia in region B. Further flashing will occur to about 20° F. and about 7.75 psia in region C and about 0° F. and about 4.5 psia in region D and in the evaporator. Coolant at outlet 12g can thus be at about 0°-5° F. and still draw heat from 10° F. ambient air.

If the flow of refrigerant could be maintained as temperatures dropped, then the flow control point will move from orifice 26f to 26g as evaporator pressure drops in response to drops in ambient temperature. This is because preceding orifices no longer restricts large volumes of vapor. At some point, however, the decreased mass flow rates that occur in practice as temperatures drop will become more significant to the volume flow rate than the increased volume of refrigerant bubbles at the flow rate control point. The lesser amounts of refrigerant can be expanded to their flashing point by the early restrictions and thus the flow rate control point will remain at orifice 26f or even move upstream to orifice 26e.

It should be appreciated that variations in operating conditions and especially evaporator pressure and mass flow rates of refrigerant will cause the principal flow control point to shift between orifices 26e, 26f and 26g. Sufficient numbers of orifices or length of capillary or both should be provided to develop the necessary pressure drop to initiate flashing and establish a control point for the entire contemplated range of ambient temperatures (and thus evaporator pressures) and mass flow rates of refrigerant.

Once cup 12a has filled to the level of point 25d, no further net accumulation of refrigerant will occur. The system will now operate at the lowest condenser and evaporator pressures and the weakest rich and weak solutions for which the system is designed to operate. The minimum operating temperature is therefore defined by the storage capacity of cup 12a.

It should be understood that the effect of the reservoir in cup 12a is to act as a solution concentration control system for an absorption heat pump.

The use of a series of orifices (or of a capillary which is equivalent and is exemplified by later embodiments) provides flow restriction at the point where the pressure drops to below the flashing pressure of the liquid. The sudden increase in fluid volume due to vapor formation at the restriction point is the primary control point for the fluid mass flow. Liquid upstream of that point encounters little restriction because of its lesser volume. Vapor-liquid downstream of that point encounters additional controlling restriction through the areas of later orifices. Because of the expanding capillaries or orifices (serially in FIGS. 1, 4 and 5 and continuously in FIG. 6) control can be maintained over a broader range of refrigerant flow rates and evaporator pressures or temperatures than with many conventional expansion means.

It is highly desirable, for efficient evaporator action, to separate the refrigerant vapor from the refrigerant liquid before contacting the coolant coils. This separation, accomplished in the preferred embodiment by element 27, enables the liquid to contact the heat exchange coils of the evaporator as liquid just at its flash point which may then evaporate and draw the maximum amount of heat from the material in the coils. The efficient cooling of material in the coils by evaporation enables maximum heat input into the refrigerant with a minimum of heat transfer surface (evaporator and coil size).

Other Embodiments

Many design changes are contemplated for the embodiment of FIGS. 1, 2 and 3. For example, the coolant of the condenser 11 may be either in tubes or within the condenser outside of tubes. Similarly, the portion 26b of the conduit 26 may be a sleeve or the like, around an inner conduit or coil through which the vapor passes from the evaporator to the absorber. The location and manner of flow of unevaporated refrigerant from conduit 12b in the precooler may also be varied. Such design changes may be made with proper regard for the desired heat capacities and heat transfer rates of the various fluids involved.

A variation in the expansion means of the invention is shown as a second embodiment in FIG. 4. There the condenser 111 has a refrigerant coil 111b and a coolant such as glycol-water in the surrounding space 111c. At the outlet 111a of the condenser 111, the coil 111d communicates with a capillary 126 extending all the way from point 111a to the inlet 127 of the evaporator 112. It is preferred, but not required, that an element similar to element 27 in FIGS. 1, 2 and 3 be provided in the evaporator 112.

The capillary 126 is of sufficient size in this portion 126a within the region designated A to cause a gradual decrease in pressure from the condenser pressure at point 111a. At low evaporator pressures, such as 8 psia for R-21, the pressure will drop to below the vapor pressure in region C where flashing combined with cooling occurs. At somewhat higher evaporator pressures such as 14 psia, flashing may first occur in region D. Under conditions where the mass flow rate of refrigerant is much lower, even though the total pressure drop is low, flashing will first occur in region B within conduit portion 126a. These three conditions are described in the first embodiment for cooling or mild heating conditions, for 35° F. ambient conditions and for 10° F. ambient conditions.

Such a capillary design is equally preferred to the orifices of the first embodiment. However, the absence of any precooler feature in conduit 126 as shown is less preferred, and a precooler would normally be located before region A.

The third embodiment of the invention is illustrated in FIG. 5. A condenser 211 has a coolant coil 211e and a surrounding space 211b for condensing refrigerant. The space 211b is connected at the condenser outlet 211a to a tube 226. The first portion 226a of the tube 226 passes through the precooler 225 at a single small cross-sectional area whereby pressure drops slowly. In region A, within the precooler, the refrigerant is cooled to about 80° F. by heat exchange with vapor passing in space 225b from gas outlet conduit 225d of the evaporator 212 to the inlet 228 of the absorber 213. The liquid refrigerant undergoes expansion into increasing diameters of capillary in portions 226b and 226c. At low evaporator pressure, such as 8 psia for R-21, flashing will occur in regions C such that the mass flow rate point will be in region C. At higher evaporator pressures, such as 14 psia flashing may first occur in regions where mass flow rate will be controlled. If refrigerant supplied by the condenser drops substantially, as occurs at 10° F. ambient, flashing may first occur in region B. Thus, proper mass flow rates are established as in the first two embodiments over a range of evaporator pressure and refrigerant amounts from the condenser.

A fourth embodiment of the invention is illustrated in FIG. 6 with a condenser 311, an evaporator 312 and a precooler 325 similar to that of the third embodiment. A conduit 326 connecting the outlet 311a of the condenser to the inlet 327 of the evaporator includes a first portion 326a of narrow-sectional area passing the length of the precooler with refrigerant therein entirely liquid. At the far end of the precooler 325, the conduit expands gradually in conical portion 326b through points B, C and D to the inlet 327 of the evaporator 312. Flashing occurs at point C under some low evaporator pressure conditions, at point D under somewhat higher evaporator pressure operation and at point B under very low evaporator pressure conditions when the amount of refrigerant supplied by the condenser is very low. Once evaporated, refrigerant passes through the conduit 325a, into the space 325b of the precooler 325, where it is in heat exchange relation with the liquid refrigerant in portion 326a and then through outlet conduit 325c to an absorber or compressor.

The foregoing preferred embodiments are provided for illustration only, and other additions, modifications and deletions may be made in these embodiments without departing from the spirit and scope of the invention as set forth in the claims that follow.

I claim:

1. An evaporation device comprising:
   expansion means for receiving liquid refrigerant at a condenser pressure and for expanding said liquid refrigerant to an evaporator pressure lower than the condenser pressure;
   an insulated housing;
   a coil within said insulated housing having an inlet and an outlet through said housing for conducting within the interior of said coil a material to be cooled by the evaporation of liquid refrigerant;
   separation means for receiving refrigerant from said expansion means and for separating liquid refrigerant from gaseous refrigerant therein and for directing said liquid refrigerant over said coil in heat exchange relation with the interior of said coil;
   means for flowing refrigerant as a thin film over the outside surface of said coil;
   gas outlet means for receiving gaseous refrigerant from said separation means and from over said coil and for conducting gaseous refrigerant out of said insulated housing; and
   storage means beneath said coil for collecting liquid refrigerant not evaporated by passage over said coil within said housing.

2. The evaporation device of claim 1 wherein said expansion means includes a liquid refrigerant precooler portion in said gas outlet means and said gas outlet means includes a gas precooler portion in heat exchange relation with said liquid refrigerant precooler portion.

3. The evaporation device of claim 2 wherein said expansion means includes a plurality of orifices of sufficiently small cross-sectional area to maintain a pressure differential between said condenser pressure and said evaporator pressure.

4. The evaporation device of claim 3 wherein all of said orifices are within a conduit outside said insulated housing and connected between said liquid refrigerant precooler portion and said separation means.

5. The evaporation device of claim 2 wherein said expansion means includes a capillary portion of sufficiently small cross-sectional area and sufficiently long length to maintain the pressure differential between said condenser pressure and said evaporator pressure.

6. The evaporation device of claim 5 wherein said capillary portion is outside said insulated housing and connected between said liquid refrigerant precooler portion and said separation means.

7. The evaporation device of claim 5 wherein at least a portion of said capillary portion includes at least a portion of said liquid refrigerant precooler portion.

8. The evaporation device of claim 1 wherein said expansion means includes a plurality of orifices of varying cross-sectional area with the orifice having the largest cross-sectional area being connected adjacent said separation means.

9. The evaporation device of claim 1 wherein said expansion means includes a capillary having portions of varying cross-sectional area with the portion of greatest cross-sectional area being adjacent said separation means.

10. The evaporation device of claim 1 further including liquid outlet means for conducting a controlled flow rate of liquid refrigerant from said storage means out of said housing.

11. A method of evaporating a refrigerant comprising the steps:
    expanding liquid refrigerant from a condenser pressure to an evaporator pressure lower than said condenser pressure;
    separating gaseous refrigerant from the liquid refrigerant;
    directing liquid refrigerant over and in heat exchange relation with a coil containing material to be cooled, whereby liquid may evaporate by withdrawing heat of evaporation from the material to be cooled to form gaseous refrigerant;
    receiving and storing unevaporated liquid refrigerant beneath the coil; and
    withdrawing gaseous refrigerant from adjacent the coil.

12. The method of claim 11 wherein said expanding step includes passing liquid refrigerant in heat exchange relation with gaseous refrigerant withdrawn from adjacent the coil.

13. The method of claim 11 wherein said expanding step includes passing liquid refrigerant through a series of orifices of increasing cross-sectional area.

14. The method of claim 11 wherein said expanding step includes passing liquid refrigerant through a capillary of increasing cross-sectional area.

15. The method of claim 14 wherein said capillary increases by steps in cross-sectional area.

16. The method of claim 11 further comprising the step of withdrawing stored unevaporated liquid refrigerant at a controlled rate from beneath the coil and increasing the net storage of unevaporated refrigerant when the rate of formation of unevaporated refrigerant exceeds the controlled rate.

17. A method of absorption heating or cooling including the method of claim 16 and further comprising the steps of absorbing the withdrawn gaseous refrigerant and withdrawn liquid refrigerant into an absorbent, generating refrigerant vapor from the absorbent at a generator pressure at least as great as the condenser pressure, condensing the refrigerant vapor at the condensing pressure to form the liquid refrigerant, and wherein the net storage of refrigerant decreases the concentration of refrigerant in said absorbent both before and after said generating step.

* * * * *